Figure 1:
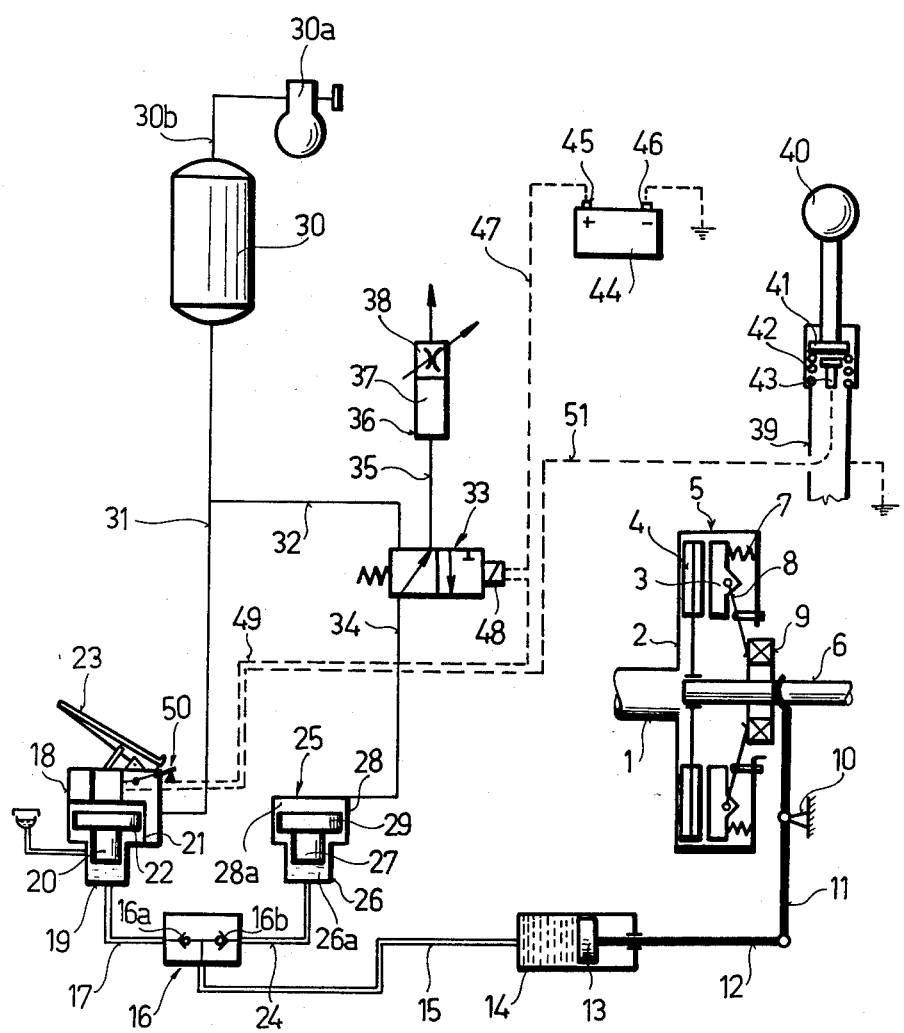

United States Patent [19]

Szarka et al.

[11] 4,275,804
[45] Jun. 30, 1981

[54] CONTROLLING AND OPERATING DEVICE FOR FRICTION CLUTCHES FOR MOTOR VEHICLES

[75] Inventors: István Szarka; János Urbantsok, both of Budapest, Hungary

[73] Assignee: Autóipari Kutató Intézet, Budapest, Hungary

[21] Appl. No.: 974,004

[22] Filed: Dec. 28, 1978

[30] Foreign Application Priority Data

Dec. 30, 1978 [HU] Hungary .............................. AU 390

[51] Int. Cl.³ ............................................. B60K 41/22
[52] U.S. Cl. .................................................. 192/3.58
[58] Field of Search ................... 192/3.58, 3.57, 3.56, 192/3.55

[56] References Cited

U.S. PATENT DOCUMENTS

| | | | |
|---|---|---|---|
| 2,560,870 | 7/1951 | Hulick | 192/3.58 X |
| 2,637,425 | 5/1953 | Long | 192/3.58 X |
| 2,945,100 | 7/1960 | Maurice | 192/3.58 X |
| 3,061,058 | 10/1962 | Barth | 192/3.58 |
| 3,204,730 | 9/1965 | Alfieri | 192/3.58 X |
| 3,228,496 | 1/1966 | Riehl | 192/3.58 |
| 3,379,291 | 4/1968 | Randol | 192/3.58 X |
| 3,667,577 | 6/1972 | Weymann | 192/3.58 X |
| 3,756,358 | 9/1973 | Espenschied | 192/3.58 X |
| 3,910,388 | 10/1975 | Moori | 192/3.58 X |

Primary Examiner—Nile C. Byers, Jr.

[57] ABSTRACT

Controlling and operating device for motor-vehicle friction clutches between the engine and a manual change-speed gear, comprising a manually operated electric switch actuated with the gear-shift lever of the vehicle; a limit switch allowing the device to be rendered inoperative; a release mechanism operated by the clutch pedal; a hydro-pneumatic release unit including two coupled working cylinders of which respective pressure spaces are connected via duct elements to a cylinder of the clutch and via an electro-pneumatic valve to a source of a pressure medium; in its rest position the valve prevents communication between the source and the space of one of the cylinders and provides a different communication from the space of that cylinder to a retarding blow-off unit that forms part of the inventive device and communicates with the free atmosphere, while when the valve is in its operative position it opens the first-named communication and prevents the other; and an electrical circuit that serially connects the electric switch and the limit switch between an electric power source and an operating electromagnet of the valve. Three exemplary embodiments of the blow-off unit are disclosed.

7 Claims, 3 Drawing Figures

CONTROLLING AND OPERATING DEVICE FOR FRICTION CLUTCHES FOR MOTOR VEHICLES

The invention relates to a controlling and actuating device for a motor-vehicle main clutch, provided with a frictional insert and arranged between the driving engine and a manually operated multi-stage change-speed gear. The clutch can be operated either by a pedal or automatically when the change-speed gear is operative.

There are known operating devices for clutches in which, when changing into second or higher gears, the circuitry of an electric switch built into the gear-shift lever brings a clutch-release device into operation, without actuating the clutch pedal. In these devices the clutch pedal has to be operated only when starting or shifting into first gear. Such a device has been described e.g. the patent publication No. 2,104,934 of the Federal Republic of Germany. According to this, the clutch is automatically operated by an electro-hydraulic system. This clutch can be operated by a pedal via a clutch-releasing working cylinder, connected by ducting to a hydraulic working cylinder fitted to the pedal, where an electric switch fitted to the pedal disables the automatic electro-hydraulic system.

The latter system consists of an electro-hydraulic valve fitted in the ducting that connects the two working cylinders, a feed pump, an electro-hydraulic control valve and a controlling/evaluating unit. The mechanism ensures both quick release of the clutch on gear change, and gradual engagement at a predefined speed of the clutch, thus achieving the required clutch slip.

The object of the invention is to provide a system for operating and controlling a clutch, that is simpler and cheaper than known devices and which can also be used on heavy-duty vehicles. In motor vehicles of the heavy category the brake system is generally operated by compressed air, therefore we have aimed at exploiting this source of energy for the operation of the automatic system. In this way, the provision of a separate hydraulic pump becomes superfluous and the automatic system can be coupled to the existing servo-assisted pneumatic valve system of the motor-vehicle clutch pedal.

These objects became attainable by ensuring that the slip required on automatic engagement of the clutch is achieved by regulating the pressure drop or the flow rate of the pressure medium (e.g. compressed air) that exits from the actuating chamber, because the pressure medium is released into the free atmosphere through a flow-retarding blow-off unit.

The invention is an improvement of controlling and operating devices for motor-vehicle friction clutches that are arranged between the engine of the vehicle and the manually operated multi-stage change-speed gear. The controlling and operating device is provided with an operator-actuated electric switch acting together with the gear shift lever of the vehicle and with a limit switch that allows to de-activate the controlling and operating device, the limit switch co-acting with the clutch pedal of the vehicle. There is a clutch release mechanism operated by the clutch pedal.

The essence of the invention resides in that it provides a a first hydro-pneumatic release unit consisting of a pneumatic working cylinder coupled to a hydraulic working cylinder, where the pressure chamber or space of the first cylinder is connected via hydraulic elements to the hydraulic working cylinder of the clutch of the vehicle, the pressure chamber or space of the second cylinder being connected via an electro-pneumatic control valve to the source of the pneumatic pressure medium of the vehicle.

The valve closes in its rest position ducting between the source and the chamber of the second cylinder, while it opens other ducting that connects the same chamber with the inventive retarding blow-off unit, that communicates with the free atmosphere. In its operative position the valve opens the first-named ducting and closes the other ducting. The circuitry of an electromagnet of the electro-pneumatic valve includes the earlier-mentioned electric switch and limit switch that are connected in series.

A preferred embodiment is suggested, wherein the retarding blow-off unit that provides the necessary slip on engagement of the clutch includes an expansion tank connected to the electromagnetic control valve and a flow throttle arranged in the outlet of the expansion tank.

In another preferred embodiment of the invention the retarding blow-off unit includes a pressure-limiting control valve, connected to the electro-pneumatic valve and a flow throttle connected in parallel to the pressure-limiting valve.

In a further preferred embodiment of the invention the retarding blow-off unit includes a pressure-limiting valve connected to the electro-pneumatic control valve, ducting for the pressure medium, connected in parallel with the valve and fitted with a flow throttle, as well as an expansion chamber connected in series with the two previous elements and having a throttle aperture communicating with the free atmosphere.

Figure 2:
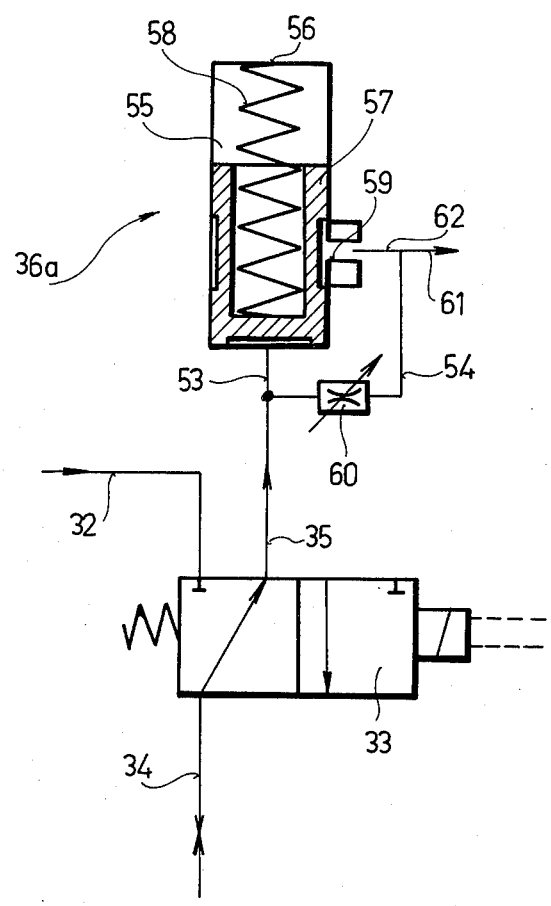
Figure 3:
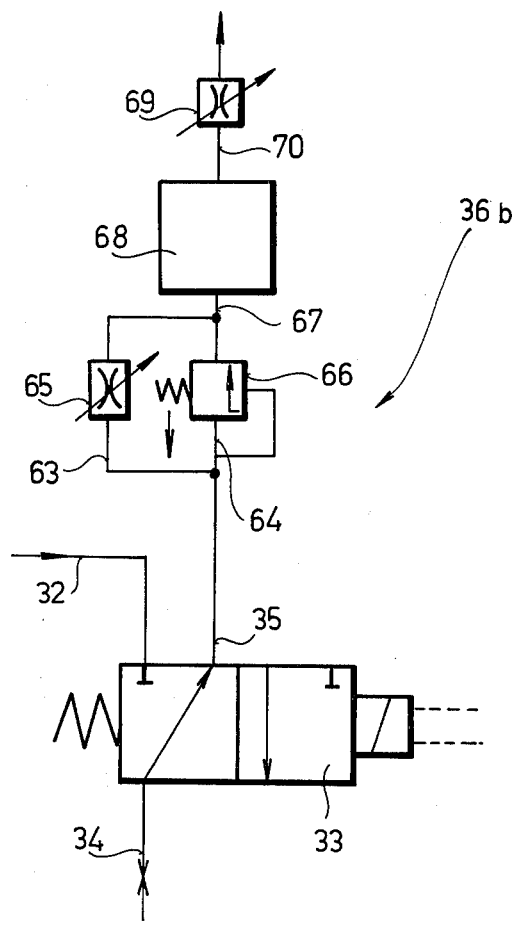

The invention is described in detail by way of a preferred embodiment with the aid of the accompanying drawings, wherein:

FIG. 1 is a schematic layout of a clutch and a circuit diagram of the operating and controlling device according to the invention; and FIGS. 2 and 3 show further embodiments of blow-off units incorporated in the inventive device.

In FIG. 1 a friction disc 4 of a clutch 5 is sandwiched by a flywheel 2 fastened on a shaft 1 of an exemplary engine and by a pressure plate 3 journalled in the flywheel. In this case, the friction disc 4 is connected to a shaft 6 of a change-speed gear (not shown) by a splined connection. The pressure plate 3 is pressed against the friction disc 4 by springs 7. Pressure arms 8 are journalled on the plate 3 and bear on the one hand against flywheel 2 and, on the other hand, in the manner of two-armed levers, against a thrust bearing 9. The latter is arranged on the shaft 6.

A clutch releasing lift-out arm 11 constructed as a two-armed lever and journalled on a pivot shaft 10, arranged in the non-illustrated housing of clutch 5 bears on thrust bearing 9. A piston rod 12 of a piston 13 of a hydraulic working cylinder 14 is linked to the arm 11. The cylinder 14 is connected via a pipeline 15 to a distributor check valve 16 to which the hydraulic cylinder 19 of a pneumatic servo-assisted foot valve 18 of a clutch pedal 23 is connected by a hydraulic pipeline 17.

A hydraulic cylinder 26 of an automatically controlled hydro-pneumatic release cylinder 25 is also connected via a hydraulic pipeline 24 to the valve 16, and a piston 27 of the cylinder 26 is positively connected to a piston 29 of a pneumatic cylinder 28.

A conventional compressed-air tank 30, of a pneumatic system of the motor vehicle is connected via a pipeline 30b to an air compressor 30a. The air tank 30 is connected via a pipeline 31 to the valve 18 which is of a well known construction. A piston 20 of the hydraulic cylinder 19 of the foot valve 18 is positively linked to a piston 22 of a pneumatic cylinder 21.

An expansion chamber 37 of the a first exemplary retarding blow-off unit 36 is connected via a pressure-medium pipeline 35 to an outlet of an electro-pneumatic control valve 33 and communicates with the free atmosphere through an adjustable throttle 38. From the release cylinder 25, a pipeline 34 leads to the valve 33, and from the latter another pipeline, identified by numeral 32, leads to the earlier-mentioned line 31, and thus to the air tank 30.

In an electrical circuit of an electromagnet 48 of the valve 33, the following elements are arranged in series connection: one terminal of the electromagnet 48 is connected to the positive pole 45 of an accumulator (battery) 44 by a lead 47; the other terminal of the electromagnet 48 is connected to one of the terminals of a limit switch 50 by a lead 49; one of the terminals of an electric switch 43 is connected to the other terminal of the limit switch 50 by a lead 51, while the other terminal of the switch 43 and the negative pole 46 of the accumulator 44 are grounded.

The limit switch 50 is fitted in such a way that it is closed when the clutch 5 is in its rest position and when the clutch pedal 23 is pressed down, the switch 50 opens. A handle 40 is linked to a gear-shift lever 39 by a pivot hinge 41 provided with a return spring 42. The electric switch 43 is arranged in the pivot hinge 41 and is in its open position when the handle 40 is in its rest (neutral) position. When changing gears by hand, the handle 40 rotates around the pivot hinge 41 due to the manual force exerted upon it and closes the switch 43 whereby the valve 33 becomes operational. When the manual force ceases, the handle 40 is restored to the neutral (middle) position and opens the switch 43.

FIG. 2 shows another embodiment of the blow-off unit (36 in FIG. 1), numbered 36a where a pressure-limiting valve 55 and an adjustable throttle 60 (somewhat similar to throttle 38 of FIG. 1) are connected in parallel to the output (pipeline 35) of the control valve 33. A piston 57 biased by a spring 58 is located in a housing 56 of the valve 55, arranged in a branch 53 of the pipeline 35. In the valve housing 56 there is formed an aperture 59 which is covered in the rest position by the piston 57. The branch pipeline 53 and another branch pipeline 54 fitted with the throttle 60, are united and after their junction continue as a common pipeline 61 which opens into the free atmosphere.

FIG. 3 illustrates a third embodiment of the blow-off unit (36 in FIG. 1), identified generally as 36b. In this embodiment, the unit, connected to the control valve 33, is essentially a combination of the details illustrated in FIGS. 1 and 2.

The pipeline 35, connected to the output of the valve 33 is divided into a branch line 63 containing an adjustable throttle valve 65, and a branch line 64 having a pressure-limiting valve 66 therein. This valve 66 is of a construction similar to that shown at 55 in FIG. 2. The branch pipelines 63, 64 are united and past their junction continue as a common pipeline branch 67 to which is connected an expansion chamber 68 communicating with the free atmosphere via another adjustable throttle 59 arranged in an exhaust or blow-off pipeline 70.

It will be understood that the throttle valves 65, 69 are essentially similar to the earlier-described adjustable throttle 60, while the expansion chamber 68 is substantially the counterpart of the described chamber 37.

The device illustrated in FIG. 1 operates as follows: To start the motor vehicle when stationary, the driver has to operate the clutch 5 by means of the foot pedal 23; when the latter is pressed down, the limit switch 50 breaks the electric circuit and disables the controlling device. Thereafter, both the clutch 5 and the gear change (parts 39 to 43) are exclusively manually operated. The driver disengages the clutch 5 and thereafter puts the engine into first gear with the aid of the gear-shift lever 39 and by releasing slowly the pedal 23 causes the clutch 5 slipping, thus starting the movement of the vehicle.

On depression of the pedal 23 the valve 18, in a known manner releases, compressed air flows from the tank 30 i.e. from pipeline 31 into the cylinder 21, the piston 22 of which causes the movement (in FIG. 1, downwardly) of the piston 20. Due to the circulating fluid, the valve 16 blocks the flow towards the cylinder 25, and the fluid or air is allowed to flow only into the working cylinder 14, thus setting piston 13 into motion and releasing the clutch 5 via lift-out arm 11.

On releasing the pedal 23 from the pressed-down position, the foot valve 18 releases the compressed air from the cylinder 22, and the same flows back from the cylinder 14 into the cylinder 19 of the pedal 18, thus causing the clutch springs 7 to bias the lift-out arm 11 into its basic position.

In the moving vehicle, for changing into second and higher gears, the automatic controlling and operating device of the invention can now be brought into operation. To this end, the clutch pedal 23 must remain in its rest position while the gear-shift lever 39 is operated to avoid actuation of the limit switch 50 by displacement of the pedal 23.

In this novel automatic clutch operation gear changes work as follows: The handle 40 of gear lever 39 pivots around pivot hinge 41 under manual power, closing the electric switch 43 which in turn causes the closure of the circuit of the electromagnet 40 of the electro-pneumatic valve 33. This control valve 33 returns to its rest position, thus closing the connecting pipelines 32, 34 between the tank 30 and the lift-out cylinder 25, and connects the cylinder 28 of the release cylinder 25 via pipeline 34, 35 with the blow-off unit 36 (FIG. 1) including the expansion chamber 37 and the throttle 38.

This blow-off unit 36 regulates the closing speed of the clutch 5, i.e. the duration of the slip. Compressed air flows from the cylinder 28 into the expansion chamber 37 and from there, via the throttle 38, into the free atmosphere. The volume of the expansion chamber 37 and the adjustably constructed throttle 38 are chosen so that they are coordinated with the volume of the pneumatic cylinder 38 to ensure that the closing of the clutch 5 is gradual and occurs with a slip while the driver gradually presses the pedal 23 to accelerate the engine.

The efficiency of operation of the inventive device depends fundamentally on the characteristics of the blow-off unit 36 which itself is matched to the clutch 5. The air pressure in the pneumatic cylinder 28 decreases in two stages. In the first stage, the characteristics of the closing spring 7 of clutch 5 predominates. It regulates the speed of closure of the clutch 5 by opening the pneumatic cylinder 28 to the expansion chamber 37, the volume of which is so chosen that at the final expansion pressure, the pressure plate 3 closes only to the slip position.

The described decrease in pressure is characterized by an exponential curve during which compressed air flows from the expansion chamber 37 and from the pneumatic cylinder 28 via the throttle 38 into the free atmosphere, and atmospheric pressure is gradually reached in the blow-off system 36.

The advantage of this arrangement is that it ensures a fairly gentle closing process, and has no moving parts which might cause trouble. It has, however, the drawback that the expansion chamber and the throttle valve must be designed specially to suit each individual type of clutch.

In the modification of FIG. 2 the possibility arises of fitting the same blow-off unit to different types of clutches because the characteristics of the blow-off unit 36a are adjustable. Due to the action of the closing spring 7 of clutch 5, the air flowing out of the pneumatic cylinder 28 is released to the free atmosphere partly through the throttle 60 and partly through the pressure-limiting valve 55. While the valve 55 is open, its linear characteristic is predominant within the overall characteristic of this blow-off unit.

This solution ensures relatively quicker closing of the clutch at an adequate clutch slip than the embodiment according to FIG. 1.

The variant according to FIG. 3 is a combination of the two preceding embodiments. The compressed air flows from the pneumatic cylinder 28 via the pressure-limiting valve 66 and the parallel-connected throttle 65 into the expansion chamber 68 for so long as the valve 66 is not closed; thereafter, while the valve 66 is closed, it flows exclusively via the throttle 65 into the expansion chamber 68, and via the throttle 69 out into the free atmosphere.

This embodiment ensures matching within wider limits than in the previous embodiments while providing the shortest closing of the clutch with the longest i.e. smoothest slip.

The controlling and operating device according to the invention can also be incorporated or retrofitted in existing motor vehicles that are provided with a compressed-air system, and is particularly recommended where the clutch operating device is manufactured as a hydro-pneumatic type, i.e. it is provided with a hydraulic release cylinder and a hydro-pneumatic foot valve.

We claim:

1. A controlling and operating device for motor-vehicle friction clutches arranged between the engine and a multi-stage, manually operated change-speed gear, including a gear-shift lever (39), the vehicle including a clutch (5) with an operating clutch pedal (23) and a hydraulic working cylinder (14), the device comprising, in combination; a manually operated electric switch (43) actuated together with said gear-shift lever; a limit switch (50) in series connection with said electric switch for selectively rendering the device inoperative; a release mechanism (18) operated by said clutch pedal; a hydro-pneumatic release unit (25) including a first hydraulic working cylinder (26) coupled to a second pneumatic working cylinder (28), wherein a pressure space (26a) comprised in said first cylinder is connected via hydraulic duct elements (15, 24) to said cylinder of the clutch, and a pressure space (28a) of said second cylinder is connected via an electro-pneumatic valve (33) to a source (30) of a pneumatic pressure medium through pipeline sections (32, 34); in its rest position said valve preventing communication in said pipeline sections between said source and said space of the second cylinder and providing communication in other pipeline sections (34, 35) that connect said space of the second cylinder with a retarding blow-off unit (36, 36a, 36b) that communicates with the free atmosphere throttle (38,60,69), while when said valve is in its operative position it opens said first-named pipeline-section communication and prevents said other pipeline-sectiom communication; and an electrical circuit (47, 49, 51) that serially connects said electric switch and said limit switch between an electric power source (44 to 46) and an operating electromagnet (48) of said valve.

2. The device as defined in claim 1, wherein said duct elements (15, 24) are constituted by duct sections fitted through a check valve (16b) that feeds said space (26a) of the first cylinder (26), these duct sections being fitted via a pipeline (17) through another check valve (16a) to a hydraulic working cylinder (19) of a pneumatic servo-assisted foot valve (18) forming part of said release mechanism and being operated by said clutch pedal (23).

3. The device as defined in claim 1, wherein said release mechanism (18) is provided with means to close said limit switch (50) when said clutch pedal (23) is in its rest position and to open said limit switch when said clutch pedal is depressed.

4. The device as defined in claim 1, wherein said gear-shift lever (39) is connected via a pivot joint (41) to a handle (40) that is connected to separate members of said switch (43) and wherein said switch is in an open position in a neutral position of said handle, and is in a closed position in a deflected position of said handle.

5. The device as defined in claim 1, wherein said blow-off unit (36) has an expansion chamber (37) connected to said valve (33), provided with an outlet fitted with an adjustable throttle (38) and thence communicating with the free atmosphere.

6. The device as defined in claim 1, wherein said blow-off unit (36a) has a pressure-limiting valve (55) connected to said valve (33), and an adjustable flow throttle (60) connected in parallel to said pressure-limiting valve.

7. The device as defined in claim 1, wherein said blow-off unit (36b) is connected to said valve (33) and includes a pressure-limiting valve (66), and adjustable throttle (65) connected in parallel with said pressure-limiting valve and an expansion chamber (68) in series connection with said pressure-limiting valve and said throttle, and wherein the outflow of said expansion chamber is fitted with a further throttle (69).

* * * * *